United States Patent [19]

Johnston

[11] Patent Number: 5,030,180
[45] Date of Patent: Jul. 9, 1991

[54] VARIABLE TRANSMISSION APPARATUS

[76] Inventor: Thomas A. Johnston, 745 Palomar La., Colorado Springs, Colo. 80906

[21] Appl. No.: 375,930

[22] Filed: Jul. 6, 1989

[51] Int. Cl.$^5$ .......................... F16H 9/26; F16H 31/00
[52] U.S. Cl. ..................................... 475/91; 192/58 B
[58] Field of Search .................... 475/91, 92, 107, 311, 475/312, 317, 296, 291, 284, 121; 192/58 B, 57, 3.52

[56] References Cited
U.S. PATENT DOCUMENTS

| | | | |
|---|---|---|---|
| 3,899,941 | 8/1975 | Cook ..................... | 475/91 X |
| 4,700,800 | 10/1987 | Friedrich et al. ............... | 475/107 X |
| 4,729,262 | 3/1988 | Lanzer ..................... | 475/91 |
| 4,747,464 | 5/1988 | Lanzer ..................... | 475/91 X |
| 4,782,930 | 11/1988 | Kuroiwa et al. ............ | 192/58 B X |
| 4,885,957 | 12/1989 | Taureg et al. ................ | 192/58 B X |

*Primary Examiner*—Allan D. Herrmann
*Assistant Examiner*—Khoi Q. Ta
*Attorney, Agent, or Firm*—Phillip A. Rein

[57] ABSTRACT

This invention relates to a variable transmission apparatus utilizing either a viscous fluid clutch means or a torque converter clutch means. In both embodiments of the variable transmission apparatus, a power input carrier means is driven from a main drive shaft and interconnected through 1) a planet gear means; 2) a sun gear means; 3) a viscous fluid clutch means or a torque converter clutch means; 4) an overdrive clutch means; and 5) outwardly to an output drive means to drive an output shaft. The viscous fluid clutch means is operable through a clutch actuator assembly connected to a clutch disk assembly in order to interconnect the sun gear assembly to the planet gear assembly which, in turn, drives an output ring gear member in a preselected mode. The torque converter clutch means is operable to selectively interconnect the sun gear means to the planet gear means so as to achieve a desired output to a ring gear assembly which is connected to an output drive shaft member. Both embodiments of variable transmission apparatus are operable to be selectively changed from 1) an idle mode; 2) a torque multiplication mode; 3) a direct drive mode; and 4) an overdrive mode.

15 Claims, 4 Drawing Sheets

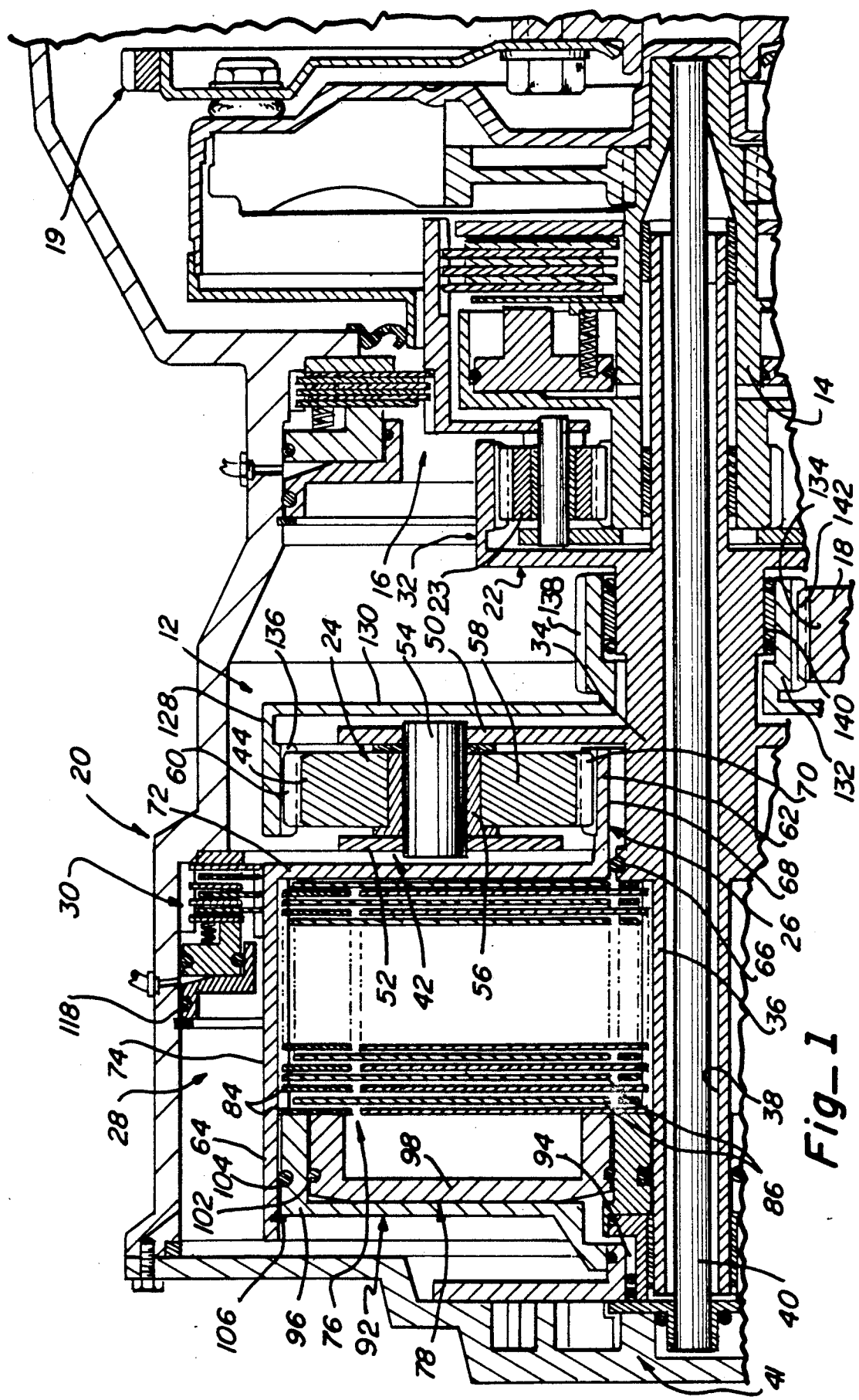
Fig_1

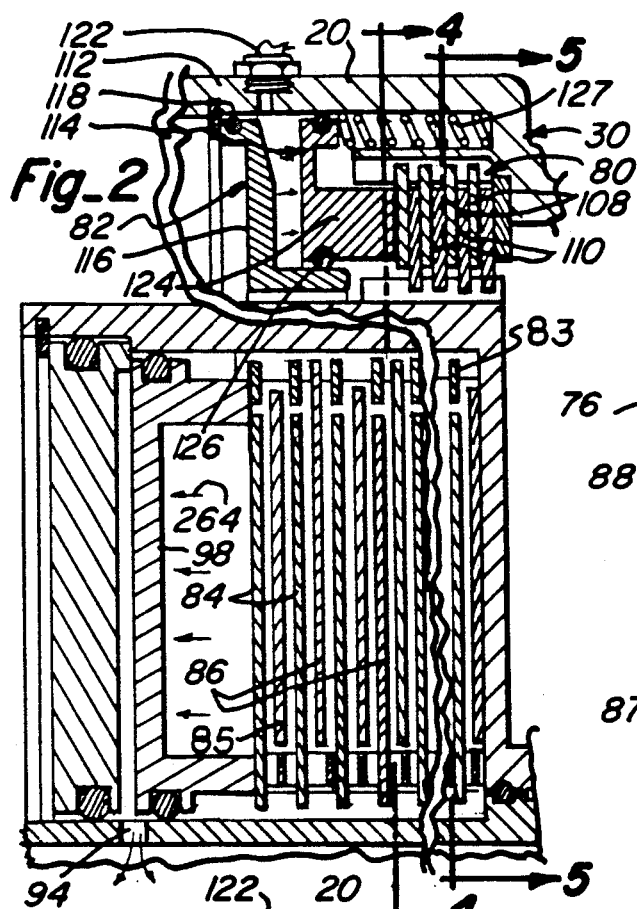
Fig._2
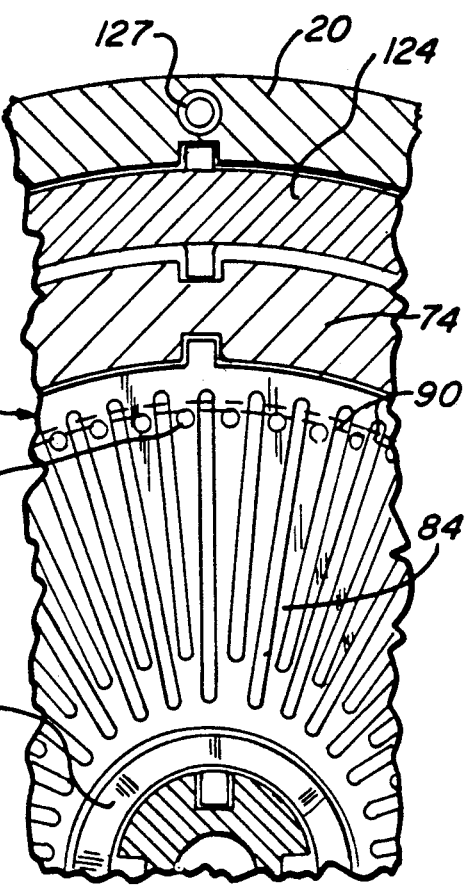
Fig._4
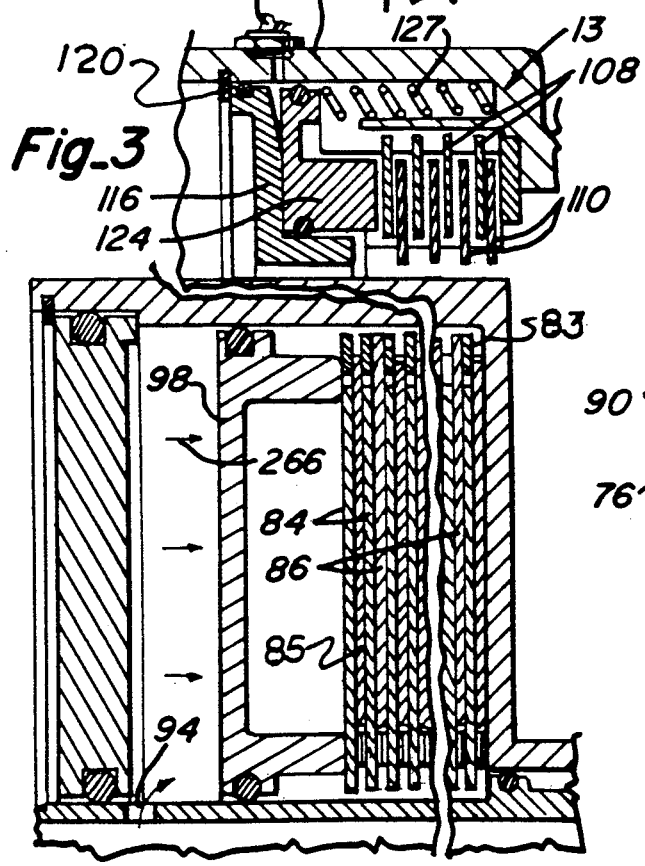
Fig._3
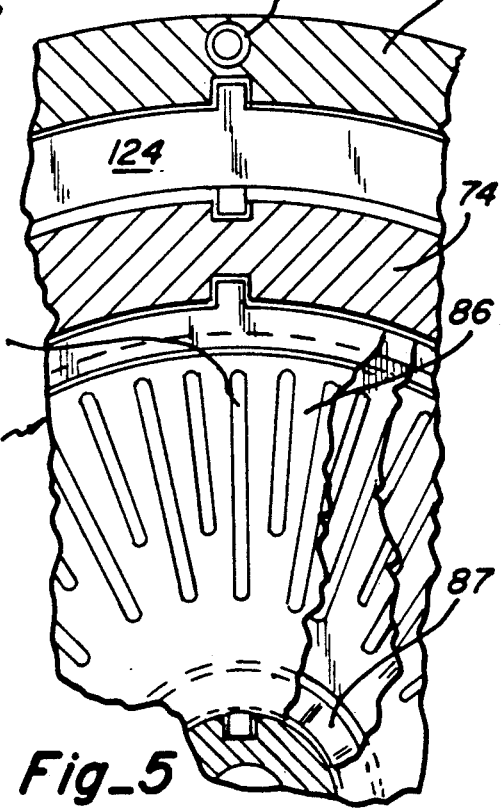
Fig._5

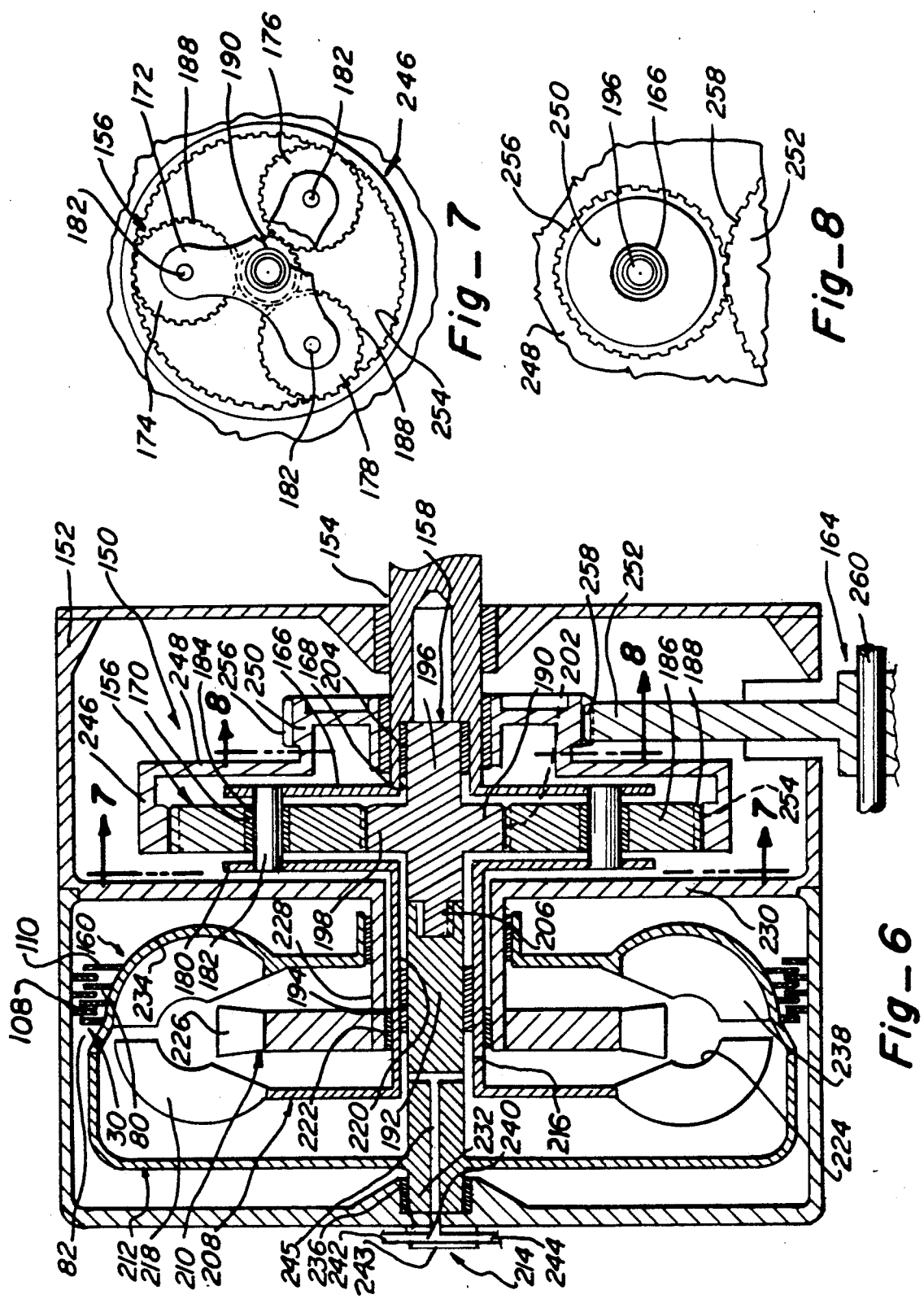

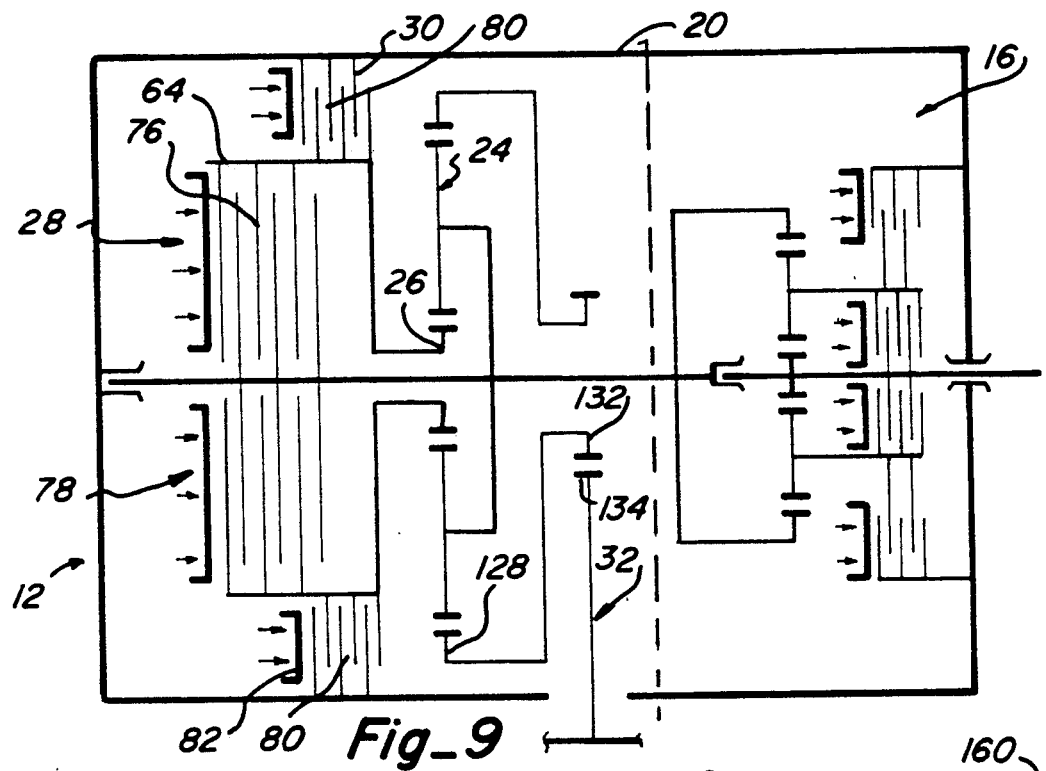
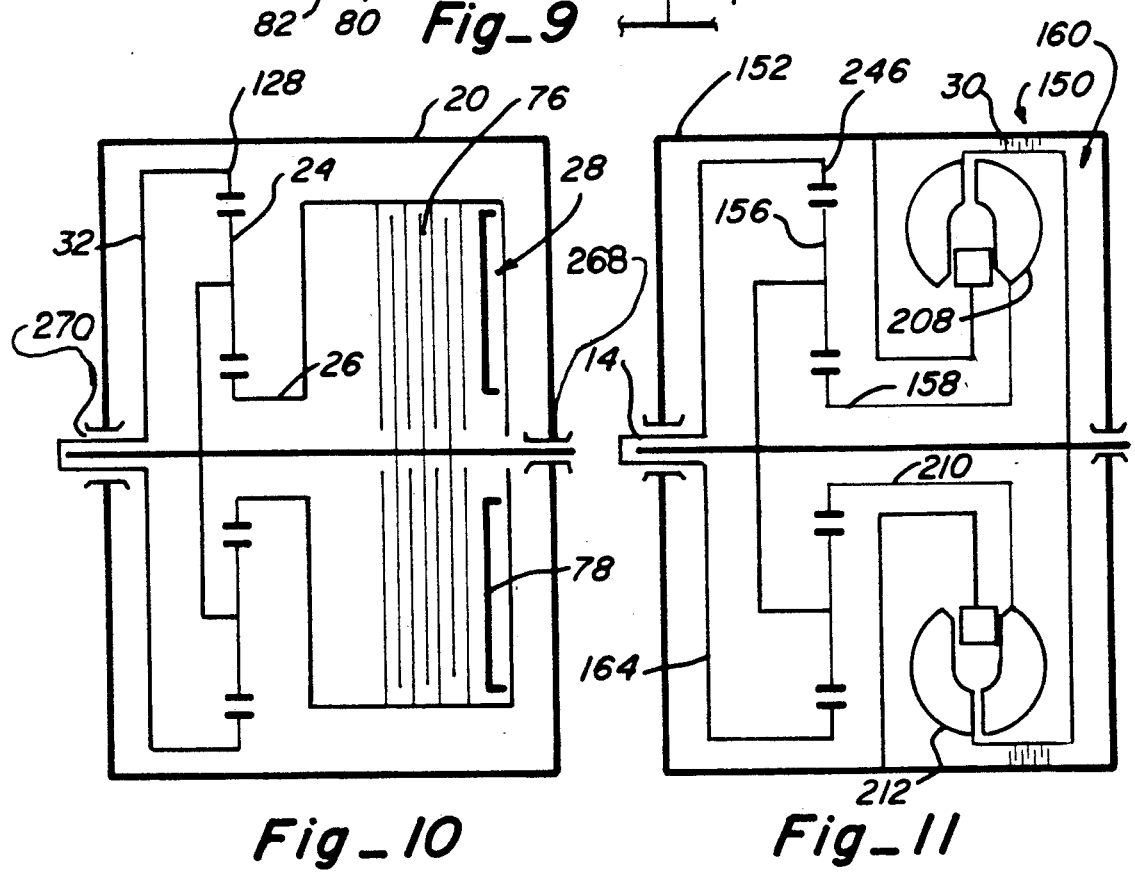
Fig_9
Fig_10
Fig_11

VARIABLE TRANSMISSION APPARATUS

PRIOR ART

A patent search on this invention revealed the following U.S. Patents:

| U.S. Pat. No. | Invention | Inventor |
|---|---|---|
| 1,403,658 | TRANSMISSION GEAR | Thorstein von Zweigberox |
| 1,638,773 | FRICTION COUPLING | Fritz Lobe |
| 2,343,509 | TRANSMISSION | Joseph Jandasek |
| 2,431,076 | HYDRAULIC APPARATUS FOR TRANSMITTING POWER FROM FROM ONE MEMBER TO ANOTHER | Robert K. Pepper |
| 3,087,355 | CONSTANTLY VARIABLE SPEED TRANSMISSION | R. J. J. Bassereau |
| 3,899,941 | CONTINUOUSLY-VARIABLE-GEAR-RATIO AUTOMATIC TRANSMISSION | John F. Cook |
| 4,031,780 | COUPLING APPARATUS FOR FULL TIME FOUR WHEEL DRIVE | Dolan et al |
| 4,621,541 | APPARATUS FOR CHANGING ROTATIONAL SPEED WITH THE AID OF CLUTCHING ACTIVITY | Takashi Takahashi |
| 4,729,262 | TRANSMISSION UNIT | Herlbert Lanzer |

Additionally, the following foreign patent is noted:

| Patent No. | Invention | Inventor |
|---|---|---|
| 3,503,134 | VEHICLE OR MACHINE VARIABLE TORQUE TRANSMISSION | Heinrich Kleff |

ANALYSIS

The German Patent No. 3,503,134, inventor Kleff, dislcoses a variable torque transmission with a clutch mechanism on the input shaft but does not have a viscous fluid clutch and overdrive features.

The Lanzer patent discloses a transmission unit usable on a vehicle utilizing a fluid coupling device and having brake structures. An input shaft drives a planetary gear train which is engagable with a ring gear which drives an output shaft.

The Cook patent discloses a variable gear ratio automatic transmission. As noted in FIGS. 1 and 2, an input shaft is operable to drive orbital or planet gears which are engagable with an outer ring gear which drive an output shaft. A fluid brake system is operably connected through an intermediate shaft and gear train to drive a sun gear.

The other references are not deemed pertinent to the applicant's claimed invention.

PREFERRED EMBODIMENTS OF THE INVENTION

In one preferred embodiment of this invention, a variable transmission apparatus including a viscous fluid clutch means is connected to an input power supply through a main drive shaft and a gear shift and clutch assembly in order to transmit input power from the main drive shaft to an output drive means. The variable transmission apparatus includes (1) a power input carrier means which is driven by the main drive shaft; (2) a planet gear means operably connected to and driven by the power input carrier means; (3) a sun gear means operably connected to the planet gear means; (4) a viscous fluid clutch means selectively operable to connect said sun gear means and said planet gear means; (5) an overdrive clutch means connected to an outer transmission housing and operable to hold the sun gear means against rotation to achieve an overdrive condition; and (6) an output drive means operable to receive variable output from the overall variable transmission apparatus. The power input carrier means includes a planet gear support section having the planet gear means connected thereto and a clutch support section having a portion of the viscous fluid clutch means connected thereto. The planet gear means includes a planet gear support assembly having a plurality, namely three, planet gear members connected thereto. The sun gear means includes a sun gear member engagable with the planet gear members and a clutch support housing engagable with another portion of the viscous fluid clutch means for operation with selective interconnection therebetween. The viscous fluid clutch means includes a clutch disk assembly having (1) control ring members; (2) control disk members; and (3) outer and inner disk members which are connected respectively to the clutch support housing of the sun gear means and to the clutch support section of the power input carrier means. The viscous fluid clutch means further includes a clutch actuator assembly which is selectively operable so as to move the outer and inner clutch disk members having the control disk members therebetween into adjoining spaced relationships so as to function as a viscous clutch structure to achieve the variable power output characteristics of this invention. The overdrive clutch means includes a clutch plate assembly actuated through an overdrive actuator assembly. The clutch plate assembly is mounted between a portion of the transmission housing and the clutch support housing of the sun gear means so as to lock the sun gear means against rotation when the overdrive actuator assembly engages and locks in the clutch plate assembly. The output drive means includes a ring gear member which is engagable with the planet gear members and operable to transfer the variable output therefrom through an output drive gear which, in turn, drives an output gear to achieve the desired output from the variable transmission apparatus of this invention.

In a second embodiment of this invention, a variable transmission apparatus is provided with a torque converter clutch means instead of the aforementioned viscous fluid clutch means in the aforementioned first embodiment. This variable transmission apparatus includes (1) a power input carrier means; (2) a planet gear means operably connected to the power input carrier assembly; (3) a sun gear means operably connected to the planet gear means; (4) the torque converter clutch means operably connected to the planet gear means and the sun gear means; (5) an overdrive clutch means operably connected between a main transmission housing and a portion of the torque converter clutch means; and (6) an output drive means connected through a ring gear assembly to an output drive gear which, in turn, drives an output gear member to achieve the variable transmission output of this embodiment. The power input carrier means includes a planet gear support section driven by the main input drive shaft. The planet gear means includes a plurality, namely three, planet gear members mounted on a planet gear support assembly and driven by the power input carrier means. The sun gear means includes a central sun gear member which is engagable with the rotating planet gear members. The torque converter clutch means includes a turbine means, a stator means, and an impeller means. The turbine means includes a turbine impeller member which is connected to the planet gear support assembly. The stator means includes a plurality of blade type stator members which are connected for non-rotation to the main transmission housing. The impeller means include an impeller member having impeller blades which are, in turn, connected to the sun gear member for rotation therewith. The overdrive clutch means is operable when actuated to interlock the stationary main transmission housing to the impeller means to cease rotation thereof. The output drive means is operable to receive the variable output therefrom through the ring gear assembly to the output gear member and, in turn, the output driven shaft which will reflect the continuously variable output to be received from the variable transmission apparatus utilizing the torque converter clutch means.

OBJECTS OF THE INVENTION

One object of this invention is to provide a variable transmission apparatus achieving a continuously variable output from a divided input.

Another object of this invention is to provide a variable transmission apparatus utilizing a combination of an interacting gear means and operable through a viscous fluid clutch means to achieve a continuously variable output.

One further object of this invention is to provide a variable transmission apparatus having a power input carrier assembly connected through a planet gear means, a sun gear means, and a viscous fluid clutch means to drive an output drive means to achieve a continuously variable output.

One other object of this invention is to provide a variable transmission apparatus having a viscous fluid clutch assembly and an overdrive clutch assembly to achieve a fuel-saving, efficient, and effective continuously variable output.

Another object of this invention is to provide a variable transmission apparatus utilizing a torque converter clutch means in order to achieve an energy efficient continuously variable output.

Still, one other object of this invention is to provide a variable transmission apparatus utilizing a torque converter clutch means and having an overdrive clutch assembly to achieve a fuel-saving, efficient, and effective continuously variable output therefrom.

Still, another object of this invention is to provide a variable transmission apparatus which is sturdy in construction; provided with a minimum amount of movable parts relative to prior art transmission structures; and utilizing a viscous fluid clutch means to achieve a fuel-saving, efficient, continuously variable output.

Various other objects, advantage, and features of the invention will become apparent to those skilled in the art from the following discussion, taken in conjunction with the accompanying drawings, in which:

FIGURES OF THE INVENTION

FIG. 1 is a vertical fragmentary cross sectional view of a transmission housing and operating assembly utilizing a variable transmission apparatus of this invention and having the lower half thereof being identical to the illustrated upper half from a central center line;

FIG. 2 is a fragmentary sectional view of a portion of a viscous fluid clutch means of the variable transmission apparatus of this invention illustrated with the clutch means in a dis-engaged condition and an overdrive clutch means in an engaged condition;

FIG. 3 is a view similar to FIG. 2 illustrating the clutch means in an engaged condition and the overdrive means in a dis-engaged condition;

FIG. 4 is a fragmentary sectional view taken along line 4—4 in FIG. 2;

FIG. 5 is a fragmentary sectional view taken along line 5—5 in FIG. 2;

FIG. 6 is a vertical sectional view of a transmission housing and operating assembly having a second embodiment of a variable transmission apparatus of this invention with a torque convertor clutch means;

FIG. 7 is a reduced fragmentary sectional view taken along line 7—7 in FIG. 6;

FIG. 8 is a reduced fragmentary sectional view taken along line 8—8 in FIG. 6;

FIG. 9 is a schematic diagram illustrating the variable transmission apparatus embodiment having the viscous fluid clutch means;

FIG. 10 is a schematic diagram of the variable transmission apparatus used with a rear wheel drive vehicle; and FIG. 11 is a schematic diagram of the second embodiment of the variable transmission apparatus with the torque converter clutch means.

The following is a discussion and description of preferred specific embodiments of the variable transmission apparatus of this invention, such being made with reference to the drawings. whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, a variable transmission apparatus of this invention, indicated generally at 12, is illustrated as having a first embodiment provided with a viscous clutch means. The variable transmission apparatus 12 is adapted to receive power from a main drive shaft 14 with the rotational speed and direction of rotation controlled through a gear shaft and clutch assembly 16 to finally drive a power output gear 18, and operable to allow engine start up through a starter gear assembly 19, all enclosed with a main outer transmission housing 20. The structure illustrated in FIG. 1 being the gear shift and clutch assembly 16 and starter gear 19, are all conventional structures which are operable through known prior art structures in order to drive the main drive shaft 14.

The variable transmission apparatus 12 includes (1) a power input carrier means or assembly 22 operably connected to the main drive shaft 14 and the gear shift and clutch assmebly 16 through a planet gear member 23; (2) a planet gear means or assembly 24 to be driven through the power input carrier assembly 22; (3) a sun gear means or assembly 26 operably connected to the planet gear assembly 24; (4) a viscous or variable clutch means or assembly 28 operably connected to the planet gear assembly 24 and the sun gear assembly 26; (5) an overdrive clutch means or assembly 30 connected between the stationary transmission housing 20 and the sun gear assembly 26; and (6) an output drive means or assembly 32 operably connected to the planet gear assembly 24 to drive a main output gear which is connected through conventional means to the drive wheel and axle assembly on a vehicle or other such devices such as pump mechanisms, milling machine structures, and the like.

The power input carrier assembly 22 includes a planet gear support section 34 integral with a clutch support section 36 and having a central opening 38 therethrough. The planet gear support section 34 is noted as being supported along its length by bearing members so as to be readily rotatable about a central axis. A center portion of the planet gear support section 34 has a central opening having an oil pump drive shaft 40 mounted therein which is connected to an oil pump assembly 41 which does not form a part of this invention but operates in a conventional manner to provide a control fluid which is known prior art knowledge.

The planet gear assembly 24 includes a planet gear support assembly 42 having a plurality of planet gear members 44, namely three, connected thereto. It is obvious that the planet gear assembly 24 and sun gear assembly 26 operate in a known manner and interact in this embodiment similar to the gear structures as illustrated in FIG. 7.

The planet gear support assembly 42 includes an anchor plate member 50 integral with and supported by the planet gear support section 34, a connector plate member 52 connected by support shafts 54 to the anchor plate member 50 and having mounted therein a bearing member 56 upon which respective ones of the planet gear members 44 are rotatably mounted on respective ones of the support shafts 54.

Each planet gear member 44 is provided with a main gear body 58 having outer peripheral planet gear teeth members 60 thereon. The main gear body 58 is provided with a central opening 68 to receive the bearing member 56 and the support shafts 54 therein.

The sun gear assembly 26 includes a sun gear member 62 connected to a clutch support housing 64 and mounted on a support bearing member 66 so as to be rotatable relative to the planet gear support section 34.

The sun gear member 62 has a central opening 68 so as to be mounted about and spaced from the planet gear support section 34 and having peripheral outer sun gear teeth 70 which are engagable with the respective outer planet gear teeth 60 on the planet gear members 44 for operation thereof as will be explained.

The clutch support housing 64 is integral with the sun gear member 62 and having an upper cylindrical side wall member 74 attachable to the viscous fluid clutch assembly 28 as will be explained.

As previously noted, it is seen that, in order to present the invention for ease of clarity, the bottom half of the variable transmission apparatus 12 as illustrated in FIG. 1 is identical to the upper half which will be identical when viewed as taken along the longitudinal axis of the oil pump drive shaft 40. Space would not permit a drawing of a size to clearly show the features of this invention and still meet the drafting rules of practice. Also, numerous bearing members are illustrated which are conventional known members allowing for the relative rotation of the elements of this invention.

As noted in FIGS. 1-3, collectively, the viscous fluid clutch assembly or clutch means 28 includes a clutch disk assembly 76 actuated through a clutch actuator assembly 78. The clutch disk assembly 76 includes (1) spaced control ring members 83 secured to the clutch support housing; (2) outer clutch disk members 84 connected to the cylindrical side wall member 74 of the clutch support housing 64; (3) inner clutch disk members 86 connected to the clutch support section 36 of the power input carrier assembly 22; (4) control disk members 85 free floating between said outer and inner clutch disk members 84, 86; and (5) a plurality of spring washer members 87 placed between the outer and inner clutch disk members 84, 86. The spring washer members 87 are operable to maintain a spaced relationship between the inner and outer clutch disk members 84, 86 when not under control fluid pressure for operation thereof as will be explained.

The outer clutch disk members 84 are provided with a plurality of fluid flow holes 88 and radially extended fluid flow slots 90. The fluid flow holes 88 and slots 90 are operable to increase the amount of viscous drag between the outer and inner clutch disk members 84, 86.

The control disk members 85 and the inner clutch disk member 86 are each provided with fluid flow slots 90 so as to increase the amount of viscous drag between the outer and inner clutch disk members 84, 86.

The clutch actuator assembly 78 includes a clutch actuator member 92; a fluid control channel 94 adapted to receive and convey control fluid flow therethrough; and an outer main housing 96.

The clutch actuator member 92 includes a movable piston member 98 mounted within the main outer housing 96 and having a peripheral seal member 102 being a O-ring mounted about the piston member 98. The piston member 98 is axially movable as will be explained to operate the clutch disk assembly 76.

The main outer housing 96 is sealed by O-ring member 104 to keep fluid therein and a retainer ring 106 that operates to allow removal of the outer housing 96 for repair and maintenance.

The clutch actuator assembly 78 is operable in a conventional manner through the use of a control assembly (not shown) which is known in the prior art to supply control fluid through the control channel 94.

As shown in FIG. 2, the overdrive clutch assembly 30 includes a clutch plate assembly 80 and an overdrive actuator assembly 82 engagable with the clutch plate assembly 80 for operation thereof.

The clutch plate assembly 80 includes a plurality of stationary plate members 108 which act as anchor plates secured to the transmission housing 20 and a plurality of rotary plate members 110. The rotary plate members 110 are secured to and rotate with the cylinderical side wall member 74 of the clutch support housing 64.

The overdrive actuator assembly 82 includes (1) an actuator housing assembly 112; (2) an actuator control assembly 114 mounted within the actuator housing assembly 112 and operably connected to the clutch plate assembly 80.

The actuator housing assembly 112 includes a support housing 116 which is mounted within an inside surface of the transmission housing 20 and sealed therewith through an O-ring 118 and held therein by a snap ring 120.

The actuator control assembly 114 includes an inlet fluid line 122 to receive control fluid therethrough; an actuator piston 124 slidably mounted within the support housing 116; and a clutch release spring member 127 to move the actuator piston 124 to the released condition as noted in FIG. 3. The actuator piston 124 is provided with O-ring members 126 to achieve a fluid seal within the support housing 116.

The actuator control assembly 114 has an overdrive control mechanism (not shown) which is operable to supply control fluid through the inlet fluid line 122 to move the actuator piston 124 from the released condition as shown in FIG. 3 to the overdrive actuated condition as noted in FIG. 2.

The output drive assembly 32 includes (1) a ring gear member 128 engagable with respective ones of the planet gear members 44; (2) a support plate member 130 integral with the ring gear member 128; (3) an output drive gear 132 connected to and integral with the support plate 130; and (4) an output gear 134 which is connected to the power main output gear 18 to which is transferred the outward rotational power from the overall variable transmission apparatus 12.

The ring gear member 128 is provided with inner peripheral ring gear teeth members 136 which are engagable with the planet gear teeth 60 of the respective planet gear members 44.

The output drive gear 132 is provided with drive gear teeth members 138 and mounted on a bearing member 140 for rotation on the planet gear support section 34.

The output gear 134 is provided with a plurality of gear teeth members 142 which are engagable with the drive gear teeth members 138 on the output drive gear 132.

It is noted that the basic input from the main drive shaft 14 is transmitted through the variable transmission apparatus 12 to the power output gear 18 to move a vehicle, power shaft on a milling machine, or the like.

In a second embodiment, a variable transmission apparatus 150 is utilized with the previously described main drive shaft 14 which is connected through a gear shift and clutch assembly (not shown) and mounted within a main transmission housing 152. The variable transmission apparatus 150 of this embodiment has a torque converter clutch means instead of the previously described viscous fluid clutch assembly 28.

The variable transmission apparatus 150 includes (1) a power input carrier means or assembly 154 driven by the main drive shaft; (2) a planet gear means or assembly 156 connected to the power input carrier assembly 154; (3) a sun gear means or assembly 158 connected to the planet gear assembly 156; (4) a torque converter clutch means or assembly 158 connected to the planet gear assembly 156 and the sun gear assembly 158; (5) an overdrive clutch means or assembly 30 connected to the main transmission housing 152 and the torque converter clutch assembly 160; and (6) an output drive means or assembly 164 which receives an output therefrom from the main drive shaft 14 through the variable transmission apparatus 150.

The power input carrier assembly 154 includes a planet support section 166 having a central shaft hole 168 and a plurality of spaced planet gear shaft holes 170 to receive and support the planet gear assembly 156.

The planet gear assembly 156 includes a planet gear support assembly 172 having connected thereto a plurality, namely three, planet gear members 174, 176, 178. The planet gear support assembly 172 includes a gear and turbine support plate 180; gear support shafts 182 on which respective ones of the planet gear members 174, 176, and 178 are mounted; and bearing members 182 to rotationally receive respective ones of the gear support shafts 182 thereon.

Each of the planet gear members 174, 176, 178 is provided with a main gear body 186 and outer planet gear teeth 188 which are engagable with the sun gear assembly 158 and the output drive assembly 164 in a manner to be explained.

The sun gear assembly 158 includes a sun gear member 190 engagable with the planet gear members 174, 176, 178 and connected to an impeller support shaft 192 which is mounted for rotation on an impeller bearing member 194.

The sun gear member 190 includes a main support shaft 196 integral with a main gear body 198 having outer sun gear teeth 202 about an outer periphery and mounted for rotation upon a bearing member 204. The outer end of the main support shaft 196 is provided with a spline teeth connector 206 for connection to the impeller support shaft 192 for conjoint rotation therewith.

The torque converter clutch assembly or variable clutch means 160 includes (1) a turbine means or assembly 208; (2) a stator impeller means or assembly 210; (3) an impeller means or assembly 212; and (4) a converter control means or assembly 214.

The turbine assembly 208 includes a turbine support shaft 216 connected to a turbine impeller member 218. The turbine support shaft 216 has a central shaft opening 220 in which the main support shaft 196 and impeller support shaft 192 are supported on bearing members 222 for relative rotation of the turbine assembly 208.

The turbine impeller member 218 includes a plurality of turbine blades 224 operable in a conventional manner as known for torque converter structures.

The stator impeller assembly 210 includes a plurality of stator blade members 226 mounted on a connector shaft 228 and secured by a connector wall 230 to the main transmission housing 152.

The impeller assembly assembly 212 includes an impeller support shaft 232 having an impeller member 234 connected thereto. The impeller support shaft 232 is rotatably mounted on bearing members 236. The impeller member 234 includes a plurality of impeller blades 238 similar to a conventional torque converter assembly.

The converter control assembly 214 includes a fluid control member 243; a fluid inlet line 242; a fluid discharge line 244; and a fluid control line 245 which leads into the interior of the torque converter clutch assembly 160 for fluid operation thereof.

The overdrive clutch assembly 30 is substantially similar in structure and operation to that described in FIGS. 2 and 3 for the first embodiment including a clutch plate assembly 80 operable through the use of an overdrive actuator assembly 82. The clutch plate assembly 80 includes stationary plate members 108 and rotary plate members 110.

The output drive assembly 164 includes (1) a ring gear assembly 246; (2) a support plate member 248 integral with the ring gear assembly 246; (3) an output drive gear 250 integral with the support plate member 248; and (4) an output gear member 252 driven by the output drive gear 250.

The ring gear assembly 246 is provided with internal ring gear teeth members 254 which are engagable with the planet gear assembly 156 and specifically with the outer planet gear teeth 188 of the respective planet gear members 174, 176, 178.

The output gear drive 250 is provided with output gear teeth members 256 which are engagable with the output gear member 252.

The output gear member 252 is provided with outer gear teeth members 258 which are engagable with the output drive gear 250 in order to rotate and to drive an output driven shaft 260.

USE AND OPERATION OF THE INVENTION

In the use and operation of the variable transmission apparatus 12 of this invention utilizing a viscous clutch assembly, the purpose and function of this invention is to provide a compact, uncomplicated, fuel-efficient, variable torque transmission with high torque multiplication capabilities. The variable transmission apparatus 12 needs a rotative input power source such as on a milling machine or a vehicle rotating a main drive shaft 14 which can be controlled through the gear shift and clutch assembly 16 which regulates forward and reverse movement.

In an idle mode of operation, the power input carrier assembly 22 is operable to be rotated by the main drive shaft 14 and gear shaft and clutch assembly 16 which operates to move the planet gear support assembly 42, the attached anchor plate member 50, the support shaft 54, and rotating the planet gear members 44. This moves the planet gear members 44 about an inside of the outer ring gear member 128. In this condition, a brake or load is applied to the milling machine or vehicle and, therefore, the ring gear member 128 is held stationary by the braking or load condition. This causes planet gear members 44 to rotate in a direction opposite to the rotation of the power input carrier assembly 22.

In this idle condition, the stationary ring gear member 128 and the rotating planet gear members 44, which are engagable with the sun gear member 62, causes same to rotate which, in turn, will rotate the inner clutch disk members 86 within the viscous fluid clutch assembly 28.

However, since the fluid clutch actuator assembly 78 is not engaged as noted by the arrow 264 in FIG. 2, this causes free rotation of the inner clutch disk members 86 and such movement is not transferred to the outer clutch disk members 84 thus achieving the idle condition. Of course, in this condition the overdrive clutch assembly 30 is in the released or dis-engaged condition as shown in FIG. 3.

Next, in a torque multiplication mode, the viscous fluid clutch assembly 28 is operable through the fluid clutch actuator assembly 78 to actuate the clutch disk assembly 76. More specifically, the clutch actuator member 92 with the piston member 98 is actuated so as to apply a control fluid through the fluid control channel 94. This operates to move the piston member 98 in an engaged condition as shown by the arrow 266 in FIG. 3. The amount of this movement can be controlled which will achieve a variable output of this invention.

A viscous fluid clutch assembly 28 is defined as one using viscous type fluid which is a fluid with a viscosity of 1000 centerstrokes or more measured at 77 degrees F.

More specifically, the piston member 98 is moved in the direction of arrow 266 which causes the outer clutch disk members 84 to move closer to the inner clutch disk members 86 and the control ring members 83 to activate the control disk members 85 thereby engaging the viscous fluid clutch assembly 28. Then, through the connection of the outer clutch disk members 84 and control ring members 83 through the cylindrical side wall member 74, the clutch support housing 64, and connection to the sun gear member 62 will hinder its free rotation. The sun gear member 62 will impart motion through the interconnected planet gear members 44 outwardly through the engaging gear teeth 60, 136 to the ring gear member 128. The ring gear member 128 through the output drive gear 132 will drive the output gear 134 which will then move from the idle mode to an output mode to drive the power output gear 18.

In the torque multiplication mode, the amount of movement of the piston member 98 regulating the closeness of the outer clutch disk members 84 relative to the inner clutch disk members 86 with use of the control disk members 85 achieves the desired torque multiplication and output through the power output gear 18.

In a direct drive mode, the piston member 98 is operable through the clutch actuator assembly 78 so that the outer clutch disk members 84, the inner clutch disk members 86, the control ring members 83, and the control disk members 85 substantially move as a single unit. In this condition, the power input carrier assembly 22 and the sun gear member 62 are rotating at the same speed which causes the ring gear member 128 to rotate as a single unit at the subject same speed. Therefore, this would transfer this direct drive or one-to-one drive ratio to the power output gear 18.

In the overdrive mode, the viscous fluid clutch assembly 28 through the clutch actuator assembly 78 places the clutch disk assembly 76 in the dis-engaged condition as noted in FIG. 2. At this time, the overdrive clutch assembly 30 through the overdrive actuator assembly 82 actuates the clutch plate assembly 80 to place same in an engaged condition as noted in FIG. 2 to the transmission housing 20.

The anchoring of the cylindrical side wall member 74 of the clutch support housing 64 operates to prevent rotation of the sun gear member 62.

As the power input carrier assembly 22 is rotated from the main drive shaft 14, it is seen that this will rotate the planet gear members 44 which will engage but rotate about the stationary sun gear member 62. This causes the planet gear members 44 to rotate forwardly to drive the ring gear member 128 forwardly at a higher speed than the actual input from the power input carrier assembly 22 to achieve the overdrive condition.

The following chart summarizes the above described four modes of operation for the variable transmission apparatus 12 utilizing a viscous clutch assembly and, more specifically, the viscous fluid clutch assembly 28 of this invention with the respective modes indicated as follows:

I—Idle
TM—Torque multiplication
D—Direct
OD—Over-drive

The status and/or rotation of the major elements of the variable transmission apparatus 12 are indicated as follows:

+—Forward motion
O—Off
P—Partial
F—Full
- —Reverse rotation
Z—Zero rotation

| CHART | | | | | |
|---|---|---|---|---|---|
| | | | MODES | | |
| ELEMENTS | | I | TM | D | OD |
| Viscous Fluid Clutch Assembly | 28 | O | P | F | O |

-continued

CHART

| ELEMENTS | | MODES | | | |
|---|---|---|---|---|---|
| | | I | TM | D | OD |
| Input Carrier Assembly | 22 | + | + | + | + |
| Planet Gear Assembly | 24 | − | − | Z | + |
| Sun Gear Assembly | 26 | + | + | + | Z |
| Output Drive Assembly | 32 | O | + | + | + |
| Overdrive Clutch Assembly | 30 | O | O | O | F |

The rotational relationship or speed in terms of revolutions per minute (RPM) of the major elements of the variable transmission apparatus 12 are expressed by the following relationships:

R is the speed of ring gear member 128
C is the speed of the power input carrier assembly 22
S is the speed of the sun gear member 62
D1 is the diameter of the sun gear member 62
D2 is the diameter of the ring gear member 128.

The rotational relationships are expressed in the following formula:

$$R = \frac{D1 + D2}{D2}(C) - \frac{D1}{D2}(S)$$

If we assume that we are utilizing a 6-inch diameter ring gear member 28 and a 1.5 inch diameter sun gear member 62, a vehicle under acceleration would show the RPM relationships charted as follows:

| | R RPM | C RPM | S RPM | Torque Ratio |
|---|---|---|---|---|
| (1) | 1 | 1000 | 4,996 | 5/1 |
| (2) | 500 | 2500 | 10,500 | 4.2/1 |
| (3) | 1000 | 2500 | 8,500 | 3.4/1 |
| (4) | 1500 | 2500 | 6,500 | 2.6/1 |
| (5) | 2000 | 2500 | 4,500 | 1.8/1 |
| (6) | 2500 | 2500 | 2,500 | 1/1 |

The line "(1)" indicates the idle mode while line "(6)" indicates the direct drive mode with the variable output achieved at the ring gear member 18 from a constant input RPM from the power input carrier assembly 22.

The use of the viscous fluid clutch assembly 28 of this invention has many advantages over the prior art viscous clutch art structures. For example, the prior art viscous clutch structures always transmit significant and consistent torque and are not capable of free rotation. This design with the addition of control disk members 85, control ring members 83, and the piston member 98 allows an incresed range of rotation from the idle condition to the direct drive mode with an infinitely variable torque output to the power output gear 18.

The spring washer members 87 in the clutch disk assembly 76 operate to space the outer clutch disk members 84, the inner clutch disk members 86, and the control disk members 85 when the piston member 98 of the clutch actuator assembly 78 is in the disengaged condition as noted in FIG. 2. In this condition, without the overdrive clutch assembly 30 engaged, as the outer clutch disk members 84 move closer to the inner clutch disk members 86 with the control ring members 83 and control disk members 85 therebetween, it increase torque transmission smoothly to a point of full engagement in the direct drive mode whereupon they rotate as a single input at the speed.

In the use and operation of the variable transmission apparatus 150 using a torque converter assembly or, more specifically, utilizing the torque converter clutch assembly 160 as noted in FIG. 6 and the schematic diagram of FIG. 11.

In the operation of an idle mode of the variable transmission apparatus 150, input from a power source driving the main drive shaft 14 operates to engage and rotate the power input carrier assembly 154 and the impeller assembly 212. The ring gear assembly 246 is held stationary by a brake or load condition. At low RPM and control fluid supply in the torque converter clutch assembly 160, then the turbine assembly 208 will not be driven by the rotating impeller assembly 212. This is in the idle mode which operates similar to that previously described for the viscous fluid clutch means 28 in the variable transmission apparatus 12.

In a torque multiplication mode of the variable transmission apparatus 150, the converter control assembly 214 operates through the fluid control member 240 to supply an operating control fluid through the fluid input line 242 and the fluid control line 245 into an interior of the torque converter clutch assembly 160. An increased presence of the operating control fluid and increased RPM of the main drive shaft 14 causes the impeller assembly 214 to rotate the operating control fluid and engage rotation of the turbine assembly 208. This reduces the RPM difference between the power input carrier 154 and the sun gear assembly 158 or, more specifically, the sun gear member 190. In reaction to this rotational force, the planet gear members 174, 176, 178 are then engaged with the ring gear assembly 246 which causes same to rotate and, in turn, drive the output gear member 252 and its interconnector output driven shaft 260.

In a direct drive mode of the variable transmission apparatus 150, the presence of operating control fluid within the torque converter assembly 160 interacts between the impeller assembly 212 and the turbine assembly 208 causing them to turn at ideally the same RPM. In this condition, the power input carrier assembly 154 and the sun gear member 190 rotate in unity thus causing the ring gear assembly 246 to rotate conjointly therewith in the direct drive mode.

In an overdrive mode of the variable transmission apparatus 150, the torque converter clutch assembly 160 is placed in a dis-engaged condition and the overdrive clutch assembly 30 is placed into the fully engaged position. This causes the impeller assembly 212 to be locked through the clutch plate assembly 80 to the main transmission housing 152. In this condition, it is noted that the sun gear member 190 is locked through the impeller assembly 212 to the main transmission housing 152 so that it will not rotate.

As the power input carrier assembly 154 rotates due to input from the main drive shaft 14, it is noted that the planet gear members 174, 176, 178 are caused to rotate forwardly due to the stationary sun gear member 190. The planet gear members 174, 176, 178 then drive the interconnected ring gear assembly 246 at a higher RPM than the input from the power input carrier assembly 154 which, therefore, achieves the overdrive mode condition.

It is noted that the use of the torque converter clutch assembly or clutch means 160 in the variable transmission apparatus 150 instead of the viscous fluid clutch assembly 28 of the variable transmission apparatus 12 achieves characteristics of a torque converter assembly which balances the torque requirements versus the torque available. This achieves a smooth adjustment from maximum torque mode multiplication at startup to a one-to-one ratio or an overdrive mode condition under ideal conditions.

The four operational modes of the variable transmission apparatus 150 are set forth by the respective modes indicated as follows:

I—Idle
TM—Torque multiplication
D—Direct
OD—Over-drive

The status and/or rotation of the major elements of the variable transmission apparatus 150 are indicated as follows:

+—Forward motion
O—Off
P—Partial
F—Full
——Reverse rotation
Z—Zero rotation

CHART

| ELEMENTS | | MODES | | | |
|---|---|---|---|---|---|
| | | I | TM | D | OD |
| Torque Converter Assembly | 160 | O | P | F | O |
| Input Carrier Assembly | 154 | + | + | + | + |
| Planet Gear Assembly | 156 | — | — | Z | + |
| Sun Gear Assembly | 158 | + | + | + | Z |
| Ring Gear Assembly | 246 | O | + | + | + |
| Overdrive Clutch Assembly | 30 | O | O | O | F |

The rotational relationship or speed in terms of revolutions per minute (RPM) of the major elements of the variable transmission apparatus 150 having the torque converter clutch assembly 160 are expressed by the following relationships:

R is the speed of the ring gear assembly 246
C is the speed of the power input carrier assembly 154
S is the speed of the sun gear member 190
D1 is the diameter of the sun gear member 190
D2 is the diameter of the ring gear assembly 246.

The rotational relationships are expressed in the following formula:

$$R = \frac{D1 + D2}{D2}(C) - \frac{D1}{D2}(S)$$

If we assume a 6-inch diameter of the ring gear assembly 246 and a 1.5 inch diameter of the sun gear member 190, a vehicle under acceleration would show the RPM relationships charted as follows:

| | R RPM | C RPM | S RPM | Torque Ratio |
|---|---|---|---|---|
| (1) | 1 | 1000 | 4,996 | 5/1 |
| (2) | 500 | 2500 | 10,500 | 4.2/1 |
| (3) | 1000 | 2500 | 8,500 | 3.4/1 |
| (4) | 1500 | 2500 | 6,500 | 2.6/1 |
| (5) | 2000 | 2500 | 4,500 | 1.8/1 |
| (6) | 2500 | 2500 | 2,500 | 1/1 |

It is seen that both of the variable transmission apparatus 12 and 150 utilize a fluid type transmission whether the viscous fluid clutch assembly 28 or the torque converter clutch assembly 160. They are similarly operable to achieve a smooth and variable transmission having the input from a dual power source operable to change from an idle condition to a variable torque multiplication condition to a direct drive condition and, finally, to an overdrive condition for fuel efficiency.

The schematic diagram of FIG. 9 illustrates the operation of the major elements of the variable transmission apparatus 12.

The schematic diagram of FIG. 11 illustrates the operation of the major elements of the variable transmission apparatus 150.

The schematic diagram of FIG. 10 illustrates the use of the variable transmission apparatus 12 used in a rear wheel drive vehicle with a power input indicated at 268 and a resultant power output indicated at 270.

The variable transmission apparatus of this invention provides a transmission means which is relatively economically to manufacture compared to prior art structures; is study in construction; reliable in use; operable to provide a variable degree of torque multiplication; and providing various modes of operation as needed from idle, torque multiplication, direct drive, and overdrive conditions.

While the invention has been described in conjunction with specific preferred specific embodiments thereof, it will be understood this description is intended to illustrate and not to limit the scope of the invention, which is defined by the following claims:

I claim:

1. A variable transmission apparatus usable with a power drive shaft, such as an engine or motor, to transfer rotational torque to an output drive means, comprising:
   (a) a power input carrier means connected to the drive shaft to achieve rotation thereof;
   (b) a planet gear means connected to said power input carrier means and rotatable therewith;
   (c) a sun gear means rotatably mounted about said power input carrier means and engagable with said planet gear means;
   (d) a viscous fluid clutch means having a first portion connected to said sun gear means and a second portion connected to said power input carrier means; and
   (e) an output drive means engagable with said planet gear means to be selectively driven thereby;
   whereby said viscous fluid clutch means is operable to achieve a variable output from the drive shaft to said output drive means.

2. A variable transmission apparatus as described in claim 1 in an idle mode condition, wherein:
   (a) said output drive means is held against rotation by a load;
   (b) said power input carrier means rotates said planet gear means which, in turn, drives said sun gear means; and
   (c) said viscous fluid clutch means is dis-engaged to a free wheeling condition.

3. A variable transmission apparatus in a torque multiplication mode as described in claim 1, wherein:
   (a) said viscous fluid clutch means is partially engaged thereby reducing the difference in rotational speed between said power input carrier means and said sun gear means;
   (b) said sun gear means rotates said planet gear means to rotate said output drive means;
   whereby a variable output is achieved in said output drive means depending on the amount of actuation of said viscous fluid clutch means.

4. A variable transmission apparatus as described in claim 1 in a direct drive mode, wherein:
   (a) said viscous fluid clutch means is fully engaged to rotate said first portion and said second portion at a same speed of rotation;
   (b) said sun gear means rotates said planet gear means at the same speed of rotation; and
   (c) said planet gear means contacts and rotates said output drive means at the same speed of rotation to achieve the direct drive mode.

5. A variable transmission apparatus as described in claim 1, wherein:
   (a) said output drive means includes a ring gear member engagable with said planet gear means and connected to a power output gear to achieve the output therefrom.

6. A variable transmission apparatus as described in claim 1, including:
   (a) an overdrive clutch means operably connected between a transmission housing and said sun gear means and said viscous fluid clutch means;
   whereby said overdrive clutch means in the engaged condition holds said sun gear means against rotation and said planet gear means rotates at a greater speed than said power input carrier means; and said planet gear means, moving at a greater rotation, engages said output drive means to cause rotation thereof to achieve the overdrive mode.

7. A variable transmission apparatus as described in claim 1, wherein:
   (a) said planet gear means includes a planet gear support assembly connected to said power input carrier means and having a plurality of planet gear members rotatably mounted on said planet gear support assembly; and
   (b) said planet gear members are engagable for rotation with said sun gear means and said output drive means when in a selected mode of operation.

8. A variable transmission apparatus as described in claim 1, wherein:
   (a) said sun gear means includes a sun gear member integral with a clutch support housing which is connected to said first portion of said viscous fluid clutch means; and
   (b) said sun gear member having outer sun gear teeth members which are engagable with said planet gear means to cause rotation thereof when in the torque multiplication mode.

9. A variable transmission apparatus as described in claim 1, wherein:
   (a) said viscous fluid clutch means includes a clutch disk assembly and a clutch actuator assembly;
   (b) said clutch disk assembly includes outer clutch disk members and clutch ring members secured to said sun gear means; inner clutch disk members secured to said power input carrier means; and control disk members mounted between said outer and inner clutch disk members; and
   (c) said clutch actuator assembly is operable in the torque multiplication mode to move said outer clutch disk members and said inner clutch disk members to a closer relationship to transfer through a control fluid motion therebetween to achieve the torque multiplication mode.

10. A variable transmission apparatus as described in claim 9, wherein:
    (a) said outer clutch disk members and said inner clutch disk members with said control disk members mounted therebetween are moved to a fully engaged position when in the direct drive mode; whereby said outer clutch disk members and said inner clutch disk members are moving in the same direction at the same speed and said sun gear means, said planet gear means, and said output drive means are moving at substantially the same speed of rotation, thus achieving the direct drive mode.

11. A variable transmission apparatus usable with a power drive shaft, such as an engine or motor, to transfer rotational torque to an output drive means, comprising:
    (a) a power input carrier means connected to the drive shaft to achieve rotation therefrom;
    (b) a planet gear means connected to said power input carrier means and rotatable therewith;
    (c) a sun gear means rotatably mounted about said power input carrier means and engagable with said planet gear means;
    (d) a viscous clutch means having a first portion connected to said sun gear means and a second portion connected to said power input carrier means; and
    (e) an output drive means engagable with said planet gear means to be selectively driven thereby.

12. A variable transmission apparatus usable with a power drive shaft, such as an engine or motor, to transfer rotational torque to an output drive means, comprising:
    (a) a power input carrier means connected to the drive shaft to achieve rotation therefrom;
    (b) a planet gear means connected to said power input carrier means and rotatable therewith;
    (c) a sun gear means rotatably mounted about said power input carrier means and engagable with said planet gear means;
    (d) a clutch means having a first portion connected to said sun gear means and a second portion connected to said power input carrier means; and
    (e) an output drive means engagable with said planet gear means to be selectively driven thereby;
    whereby said clutch means is operable to achieve a variable output from the drive shaft to said output drive means.

13. A variable transmission apparatus as described in claim 12 in an idle mode condition, wherein:
    (a) said output drive means is held against rotation by a load;
    (b) said power input carrier means rotates said planet gear means which, in turn, drives said sun gear means; and
    (c) said clutch means is dis-engaged to a free wheeling condition.

14. A variable transmission apparatus in a torque multiplication mode as described in claim 12, wherein:
    (a) said clutch means is partially engaged thereby reducing the difference in rotational speed between said power input carrier means and said sun gear means; and
    (b) said sun gear means rotates said planet gear means to rotate said output drive means;
    whereby a variable output is achieved in said output drive means depending on the amount of actuation of said clutch means.

15. A variable transmission apparatus as described in claim 12 in a direct drive mode, wherein:
    (a) said clutch means is fully engaged to rotate said first portion and said second portion at a same speed of rotation;
    (b) said sun gear means rotates said planet gear means at the same speed of rotation; and
    (c) said planet gear means contacts and rotates said output drive means at the same speed of rotation to achieve the direct drive mode.

* * * * *